June 7, 1938.        H. R. TEAR        2,120,007
CARTRIDGE FOR LUBRICANTS AND OTHER MATERIALS
Filed May 31, 1935        2 Sheets-Sheet 1
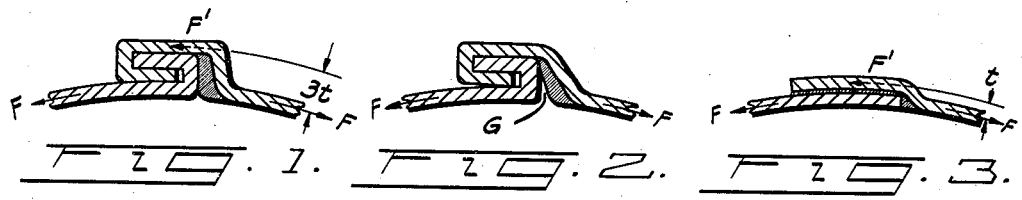
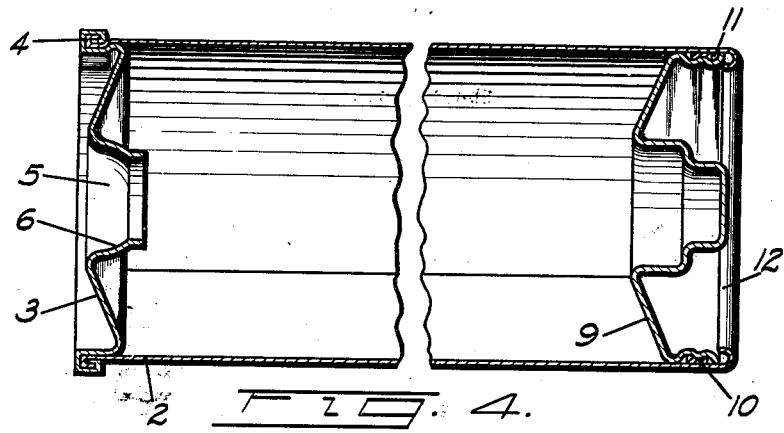
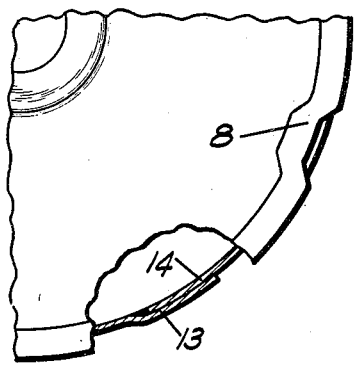
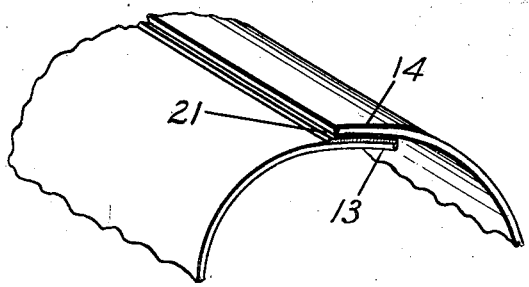
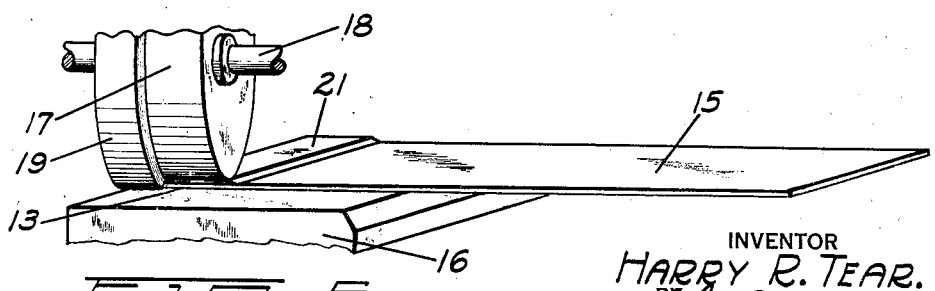
INVENTOR
HARRY R. TEAR.
BY
ATTORNEY June 7, 1938.  H. R. TEAR  2,120,007
CARTRIDGE FOR LUBRICANTS AND OTHER MATERIALS
Filed May 31, 1935  2 Sheets-Sheet 2

INVENTOR
HARRY R. TEAR.
BY
ATTORNEY

Patented June 7, 1938

2,120,007

UNITED STATES PATENT OFFICE 2,120,007

CARTRIDGE FOR LUBRICANTS AND OTHER MATERIALS

Harry R. Tear, Evanston, Ill., assignor to The Lubrication Corporation, Chicago, Ill., a corporation of Delaware Application May 31, 1935, Serial No. 24,230

3 Claims. (Cl. 206—56)

This invention relates to improvements in cartridges for lubricants and other materials and a method of constructing the same.

The use of interchangeable lubricant-containing cartridges as a source of lubricant supply for lubricating guns and dispensers presents many advantages, not to be obtained by the use of bulk lubricants, such as cleanliness, ease of handling and storage, as well as quick interchange of lubricant supply. The latter feature is an important one for it enables a person with but one gun, or dispenser, to service the several types of bearings of an automobile chassis, or the like, with various proper grades of lubricants as required.

In order, however, profitably to employ lubricant cartridges it is necessary that the cost of manufacture of the cartridges be small compared with the cost of the lubricant contents thereof. It is desirable therefore that the side walls of such cartridges be made of relatively thin material, such as thin sheet metal, to minimize material cost. Where sheet metal is employed for this purpose, a rectangular sheet of the material, cut to the proper size, is rolled into a cylindrical form, the adjacent edges being joined by a suitable seam.

Sheet metal cartridges employing the conventional type of lock seam almost universally used in the construction of sheet metal containers have been found to be unsatisfactory, due to the tendency of the seam to open up under pressure and to the difficulty of preventing leakage along the seam past a follower piston used in the cartridge. It is also extremely difficult and expensive to fill this type of seam with solder so that the cartridge will present a smooth inner surface.

I have found that the use of a lap seam for such cartridges will overcome the disadvantages and difficulties incident to lock seam cartridges. Lap seams will withstand much greater internal pressure than lock seams without opening up. They present a much smaller gap along the seam through which leakage past the piston may occur and they are easier and cheaper to fill with solder to present a smooth inner surface.

It is, therefore, an object of my invention to provide an improved original package lubricant cartridge incorporating a novel lap seam for joining the overlapping portions of the relatively thin metal side-wall together wherein leakage through spreading of the wall seam under internal operating pressures is unlikely to occur.

Another object is to provide a novel and simple method of constructing a cartridge of the type described.

A further object is to provide a lubricant cartridge having a piston slidably mounted therein, the side-wall at the seam being so constructed as to preclude the by-passing of lubricant past the piston packing as the piston is urged inwardly along the axis of the cartridge body.

Other objects, the advantages, and novel features will be apparent after reading the following specification and claims, and after consideration of the drawings forming a part of this specification, wherein:

Figs. 1 and 2 are fragmentary sectional views of a conventional folded cartridge wall seam illustrating, respectively, the seam as it appears before, and after, the application of internal pressure thereto;

Fig. 3 is a view similar to Fig. 1 of a cartridge wall seam constructed in accordance with my invention;

Fig. 4 is a sectional view through a lubricant cartridge constructed in accordance with my invention;

Fig. 5 is a fragmentary end elevation of the cartridge of Fig. 4 viewed along the line V—V of Fig. 4;

Fig. 6 is a perspective view illustrating one step in the process of constructing the cartridge;

Fig. 7 is a perspective view of the cartridge side-wall partially assembled and as it appears subsequent to the operation of Fig. 6;

Figure 8:
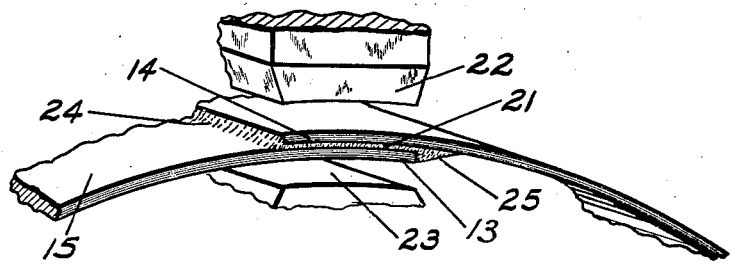
Fig. 8 is a fragmentary view illustrating the finished lap seam of the cartridge of Fig. 4.

In Figs. 1, 2 and 3, I have illustrated, for purposes of comparison, a conventional type of lock seam and an embodiment of my improved lap seam as applied to the overlapping edges of a cartridge side wall. Fig. 1 illustrates a folded lock seam as it normally appears in section and Fig. 2 illustrates the seam subsequent to the application of internal pressure to the side wall, indicating a spreading of the seam, forming gap "G" through which contents of the cartridge, or container, may readily leak past the piston thereof.

In the lock seam shown in Fig. 1, the only forces tending to resist opening of the gap G are the bending resistance of the sheet metal at the right edge of the seam and the tensile strength of the solder fillet, which is small and practically negligible compared with the strength of the sheet metal.

The pressure applied to the contents of the cartridge is transmitted to the cartridge wall and is resisted by a tensile force in the sheet metal, as indicated at F. In the offset portion of the seam shown at the right of Fig. 1, the tensile force F' acting in the outermost fold of the seam is substantially equal and opposite to the force F, and acts at a distance from the latter equal to the center to center distance between the two portions of the sheet metal, indicated as $3t$ or three times the thickness of the sheet. The moment of this force couple is $F \times 3t$ or $3Ft$, which is the total bending moment resisted by the sheet metal.

In the seam shown in Fig. 3 the force F' acts at a distance from the force F of only $t$, the center to center distance of the offset of the sheet. Thus the bending moment in this case is only $Ft$, or one-third that existing in the lock seam. Using the same thickness of sheet metal in each case, the resisting moments will be the same, and it is obvious that the material in the lap seam will be subjected to only one-third the stress existing in the lock seam under the same pressure. Since the moment is directly proportional to the pressure, it follows that the lap seam will withstand, before yielding, a pressure three times the yielding pressure of the lock seam. In other words, the lap seam is substantially three times as strong as the lock seam.

Another important advantage of the lap seam concerns the effect of yielding of the metal under excessive pressure. A comparison of Figs. 2 and 3 will make it clear that gap G formed when the metal at the offset yields is approximately three times as deep and, with corresponding degrees of deflection, three times as wide, as the gap formed by yielding or "opening up" of the lap seam. Furthermore, any yielding of the seam results in an increase in the internal circumference of the cartridge wall which increase is obviously much greater in the case of a lock seam than in the case of a lap seam. As a result of this increase in circumference, clearance space between the piston and the cartridge wall is created, through which additional leakage may take place, the leakage obviously being considerably greater with a lock seam because of the greater clearance. A further harmful result of clearance between piston and cartridge wall is the possibility of the packing which may be used to seal the piston being forced through the clearance space and causing binding of the piston if it remains there, or permitting copious leakage if it is forced entirely out of this space.

In the case of a lap seam with no offset, the forces F and F' will be in alignment and there will be no bending moment. This seam resists the internal pressure almost entirely in tension and will withstand a pressure many times that required to open up either the lock seam or offset lap seam before yielding. It is, therefore, apparent that a seam of the type forming the subject-matter of my present invention possesses several most important advantages over the conventional lock seam and is of particular importance in lubricant containing cartridges wherein the contents of the cartridge must be subjected to internal pressure.

With reference to Fig. 4, my improved lubricant cartridge may comprise a cylindrical sheet metal body 2, a head 3, joined to the forward end of the body 2 by a double lock seam 4, the head 3 having a discharge opening 5 centrally located therein. A portion of the wall 6 of the discharge opening, as indicated in Fig. 4, may be spherical in contour to provide a contact surface for engagement with a spherical cartridge connector stud (not shown) forming a part of the lubricating gun or dispenser. A closure cap may be used to close the discharge opening 5 when the cartridge is not in use. Lugs formed in the seam 4, as indicated in Fig. 5, provide a means by which the cartridge may be attached, at will, to the gun or dispenser. Mechanism for engagement with the lugs 8, detachably to mount the cartridge upon the gun or dispenser, and including the spherical connector stud, is described and claimed in Dodge Patent No. 1,987,002, dated January 8, 1935.

The rearward end of the cylindrical cartridge body 2 is preferably closed by a piston 9 having a soft rubber packing ring 10 located in an annular groove 11 formed in the peripheral wall of the piston so that thrust applied to the piston may result in the discharge of the lubricant from the cartridge through the discharge opening 5. Subsequent to the placing of the piston 9 in the cartridge body, as indicated in Fig. 4, the rearward edge of the body 2 may be rolled inwardly to form a bead 12, thus to reinforce the rearward end of the cylindrical cartridge body and to prevent dislodgment of the piston 9 therefrom.

As heretofore explained, the present invention has particularly to do with the joining of the opposite edge portions of the sheet metal forming the cylinder body 2. This joint, as indicated in Fig. 5, is formed by overlapping the adjacent and opposite edge portions 13 and 14 of the sheet for a distance of approximately ¼" and then soldering the overlapping portions to one another in such a way as to provide uniform distribution of solder throughout the entire area of the overlapping surfaces.

In Figs. 6 to 8, I have illustrated the principal steps in one method of forming the cylindrical cartridge body and constructing the lap seam. A relatively thin rectangular metal sheet, as indicated at 15, of a width determined by the length of the finished cartridge, is placed upon the upper surface of a platen 16, preferably formed of a material having low heat conductivity and which will not tin, with the end portion 13 in registration with a soldering roller 17. The roller 17 may be formed of copper and mounted upon a shaft 18 so that it may be rolled along the edge portion 13 of the metal sheet. The soldering roller may have a diametrically enlarged portion 19 upon one side thereof which is adapted to bear directly upon the platen 16 providing a shoulder engageable with the cut edge of the sheet. This arrangement causes solder adhering to the soldering roller to be transferred to the edge portion 13 of the metal sheet in a film 21 having a thickness substantially equal to the distance between the upper surface of the sheet and roller 17, and also to the cut edge of the sheet.

Solder is supplied to the roller 17 by any suitable feeding device, not shown, and the roller may be heated in any desired manner as by electricity or a gas burner. According to one arrangement, the platen 16 may be a stationary flat plate along which the roller rolls or it may be in the form of a roller rotating on a fixed axis in which case the roller 17 also rotates on a fixed axis and the metal sheets are fed between the two rollers.

Subsequent to the disposition of the solder film 21 along the edge portion 13 of the metal sheet 15, the sheet is rolled into a cylindrical form, as indicated in Fig. 7, with the solder film 21 facing the inner surface of the edge portion 14. If desired, the inner surface of edge portion 14 may also be coated with solder but normally this will not be necessary.

Thereafter the overlapping portions 13 and 14 of the metal sheet are subjected to heat and pressure by a hot iron 22 which is caused to descend upon the super-imposed edge portions of the metal sheet toward a stationary horn 23. In Fig. 8, I have illustrated the lap seam as it appears subsequent to this step in the process. It will be noted that the solder film 21 has been compressed so as to extrude solder at both sides of the overlapping portions 13 and 14 thus to provide fillets at the extreme edges of the metal sheet portions.

This simple construction of the lap seam insures uniform distribution of solder throughout the entire overlapping portion of the relatively thin metal forming the cylindrical tube so that a tight bond is provided at the joint thus formed which is capable of resisting relatively high mechanical strains tending to separate the overlapping portions. The extrusion of solder, particularly at 25, as indicated in Fig. 8, serves to eliminate leakage which might otherwise occur about the piston packing 10 as the piston is urged against the lubricant contents of the cartridge and also serves to coat the exposed edges with solder, protecting them from rusting.

I have thus provided a simple and highly effective seam for lubricant cartridges possessing, as has been pointed out in connection with Figs. 1, 2 and 3, certain cardinal advantages over the conventional lock seam ordinarily used for containers and cartridges of a similar nature.

Figure 9:
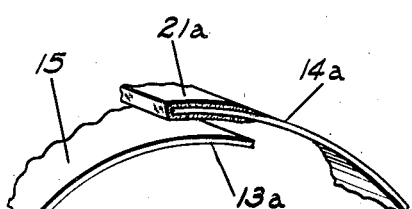
Fig. 9 is a fragmentary view similar to Fig. 7 of a modified form of the seam.
Figure 10:
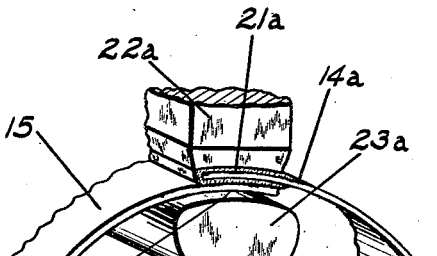
Fig. 10 is a view similar to Fig. 8 illustrating the completed seam subsequent to the operation of Fig. 9.
Figure 11:
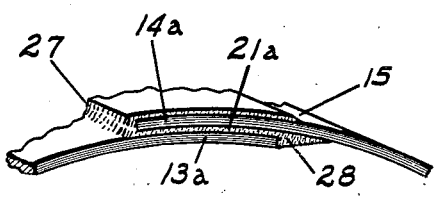
Fig. 11 is a fragmentary view illustrating the finished lap seam of Figs. 9 and 10.

In Figs. 9, 10 and 11, I have illustrated steps in a modified method of forming another embodiment of the lap seam described. The seam illustrated therein is formed by dipping the edge 14a of the metal sheet 15 in a bath of hot solder so as to cause the entire edge portion 14a to be coated with a film 21a, as indicated in Fig. 9. The sheet may then be rolled into the form of a cylinder and the overlapping portions 13a and 14a of the sheet may be placed over a horn 23a and a soldering tool 22a lowered thereupon so as to cause the solder film 21a to flow and to provide a tight and uniform bond between the overlapping edge portions of the cylinder side-wall. I prefer to construct the soldering tool 22a of a metal such as aluminum which will not "tin" with solder so that the solder upon the outer side of the edge portion 14a will not be transferred to the iron but will flow over the cartridge wall surface, a portion thereof forming a fillet, as shown at 27 in Fig. 11. In like manner the solder may flow along the extreme edge of 13a to form a fillet as at 28. This fillet will be filled by a yielding packing on the piston or follower so that no leakage will occur.

In the lap seam of Fig. 11 the method of construction assures a more complete bond between the overlapping portions of the cylindrical sidewall than that provided by the method illustrated in Figs. 6 to 8 inclusive inasmuch as a considerable quantity of solder is caused to be extruded and to flow along the extreme edge of the outer of the overlapping portions 14a. An additional advantage provided by this form of the seam is that of presenting a relatively smooth outer side-wall surface for the cartridge by the complete covering of the exposed edge of the sheet metal, a feature which is desirable to prevent rusting of the cut edge.

Figure 12:
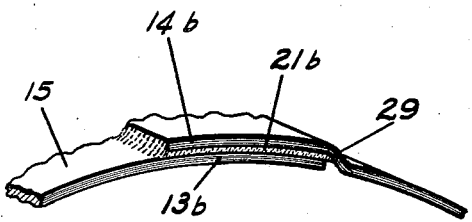
Figs. 12 and 13 are fragmentary views of a modified form of the lap seam.
Figure 13:
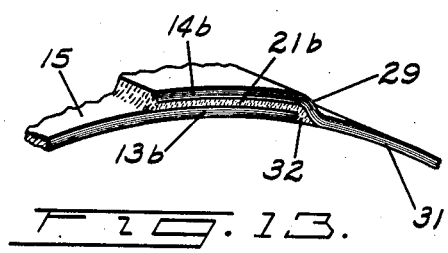

In Figs. 12 and 13, I have illustrated another form of the lap seam which may be soldered after the manner illustrated in either Figs. 6 to 8 inclusive or Figs. 9 to 11 inclusive, the principal difference being that the portion 14b is offset slightly as shown at 29 from the body of the metal sheet 15 forming the cartridge side-wall so that the inner face of edge portion 13b may lie flush with the inner surface 31 of the metal sheet 15 at the opposite edge portion thereof. The principal advantage of this form of the seam over that previously described is that the possibility of by-passing lubricant about the packing 10 of the piston is further reduced, particularly in such cases as where the solder film 21b is caused to flow sufficiently to fill in the space immediately adjacent to the extreme edge of the edge portion 13b, as indicated at 32 in Fig. 13.

In forming the lap seam of Figs. 12 and 13 according to the method illustrated in Figs. 6 to 8, either the offset or plain edge may be coated with solder by the apparatus of Fig. 6 and the edges may then be joined by heating and pressing them together in the same manner illustrated in Fig. 8. If it is desired to form this offset lap seam by the method of Figs. 9 to 11, the offset edge portion is preferably dipped in solder and then the cartridge is completed in the same manner as the cartridge illustrated in Figs. 9 to 11.

A seam of the type illustrated in Fig. 12 is entirely satisfactory for use with extremely heavy lubricants or greases which would not have much tendency to extrude through the small space in the seam past the piston, but for use with lighter or more fluid lubricants, it is preferable to fill in this space as at 32 in Fig. 13 to provide a smooth surface sealing with the piston and positively preventing any leakage of lubricant past the piston. A seam may also be constructed according to a combination of Figs. 12 and 13, the major part of the seam being formed as in Fig. 12 and the portion adjacent that end in which the piston is initially located being formed as in Fig. 13. With this construction the piston seals completely around its periphery during the time when the cartridge is in storage or in transit during shipment whereby any seepage past the piston is prevented, and the amount of seepage past the piston during the short time the cartridge is in use is so small that it may be disregarded. This arrangement results in a great saving in labor, particularly in cases where it is necessary to form the solder fillet by hand.

After the side seam is formed and prior to assembly of the head and piston thereon, the can body is preferably subjected to a planishing operation to smooth out any irregularities in the body and to remove excess solder from the seam. This planishing operation per se forms no part of the present invention and is therefore not described herein in detail but is fully described and claimed in the copending application of Adiel Y. Dodge, Serial No. 14,792, filed April 5, 1935.

It is to be understood that the described embodiments of the invention herein set forth are presented for the purpose of illustration only, and various changes may be made therein without departing from the spirit and scope of the invention. It is accordingly not my intention to be limited to any of the illustrated embodiments or otherwise than by the terms of the appended claims.

I claim:

1. A lubricant cartridge comprising, a cylindrical body made up of a sheet of metal having its edges connected by a joint which interrupts the smooth continuity of its inner surface, a follower in said cartridge forming a movable end closure for the cartridge and initially positioned at one end thereof and sealing against the cartridge side wall around its periphery, and a solder fillet adjacent the joint at said end only of the cartridge to restore the smooth continuity of the inner surface.

2. A lubricant cartridge comprising, a cylindrical body made up of a sheet of metal having its edges joined by a lap seam, a solder fillet extending along said seam to maintain the smooth circular contour of the inner surface of said body, and a circular follower in said body forming a movable end closure for the body and sealing around its periphery against the inner surface of the body.

3. A lubricant cartridge comprising a cylindrical body made up of a sheet of metal having its edges connected by a joint which interrupts the smooth continuity of its inner surface, a follower in said cartridge forming a movable end closure for the cartridge and sealing against the cartridge side wall around its periphery, and a solder fillet adjacent the joint to restore the smooth continuity of the cartridge inner surface whereby the follower will form a tight seal therewith.

HARRY R. TEAR.